United States Patent [19]

McWilliams et al.

[11] Patent Number: 4,653,789

[45] Date of Patent: Mar. 31, 1987

[54] RETRIEVAL TOOL FOR SEMI-OBSCURED ARTICLES

[76] Inventors: Judy A. McWilliams, 5331 Valley Cir., Omaha, Nebr. 68106; Margaret J. Nielsen, 2918 S. 121st St., Omaha, Nebr. 68144

[21] Appl. No.: 836,085

[22] Filed: Mar. 4, 1986

[51] Int. Cl.$^4$ .......................... B25J 1/02; B25J 15/00
[52] U.S. Cl. ...................................... 294/1.1; 294/19.1
[58] Field of Search ...................... 294/1.1, 19.1, 65.5; 15/104 A; 271/33

[56] References Cited
U.S. PATENT DOCUMENTS

| | | | |
|---|---|---|---|
| 517,295 | 3/1894 | Pulling | 294/1.1 X |
| 2,428,864 | 10/1947 | Boyd | 294/65.5 |
| 3,623,179 | 11/1971 | Roth | 15/104 A |
| 3,797,875 | 3/1974 | den Hamer | 294/1.1 |
| 3,864,993 | 2/1975 | Hovind | 15/104 A X |
| 3,974,539 | 8/1976 | Barouh et al. | 294/1.1 X |
| 4,073,530 | 2/1978 | Seidler | 294/1.1 X |

Primary Examiner—Johnny D. Cherry
Attorney, Agent, or Firm—George R. Nimmer

[57] ABSTRACT

The manually wieldable retrieval tools include a normally tacky frontal probe for adhering to documents or other articles to be rescued from semi-obscured locations. The retrieval tool includes an elongate handle, preferably of telescoping or other selectively variable length, and also preferably somewhat resiliently flexible for negotiating a semi-obscured article. The tacky adhesive frontal probe is protectably coverable, prior to initial retrieval usage and/or between periodic usages. After numerous retrieval usages whereupon the probe adhesive power becomes exhausted, the adhesive probe may be conveniently replaced at the handle forward-end with a fresh adhesive probe.

13 Claims, 8 Drawing Figures

RETRIEVAL TOOL FOR SEMI-OBSCURED ARTICLES

BACKGROUND OF THE INVENTION

The prior art does allude to retrieval tools for rescuing articles from semi-obscured locations, such as from beneath or behind refrigerators, file cabinets, heavy furniture, etc. Illustrative of the prior art are U.S. Pat. Nos. 3,887,225, 4,236,742, 4,253,697, 4,263,864, 4,313,632, and 4,359,240. However, these prior art retrieval tools are based upon magnetic or upon mechanical-linkages type probes for rescuing semi-obscured articles. Those of the magnetic type are wholly unsatisfactory for retrieving non-ferrous articles. And those of the mechanical-linkages type tend to be structurally complex, expensive, and cumbersome for operational retrieval, especially if the semi-obscured article is light weight, flimsy, small in size, or located in an angular recess.

OBJECT OF THE INVENTION

It is accordingly the general object of the present invention to provide retrieval tools for semi-obscured articles and that overcome the disadvantages and deficiencies associated with prior art retrieval tools. Ancillary general objectives include the provision of retrieval tools that are adapted to rescue articles of various sizes and structural characteristics, that are adapted to probe and to retrieve from various semi-obscured locations, that are relatively easy to use by practically all persons and including too those who are moderately physically handicapped, and that are economical and reliably repeatedly usable for the intended retrievel purposes.

GENERAL STATEMENT OF THE INVENTION

With the above general objectives in view, and together with other specific and ancillary objectives which will become more apparent as this specification proceeds, the retrieval tools for rescuing articles from semi-obscured locations generally comprise: an elongate handle member that is preferably telescoping or of other selectively variable elongate length and that is desireably transversely resiliently flexible; a probe including a tacky adhesive located forwardly of the handle forward-end and there adapted to adhere to a rescuable semi-obscured article, the adhesive tackiness being maintainable such as through appropriate packaging and mounting therefor or by an interim protective cover, and the probe preferably taking the form of a removably attachable novel cap type structure; and together with other novel optional features rendering the retrieval tools especially adaptable for the intended purposes.

BRIEF DESCRIPTION OF THE DRAWING

In the drawing, wherein like characters refer to like parts in the several views, and in which:

FIG. is a side elevational view (partly in section) of a rudimentary first embodiment (10) of the retrieval tool concept of the present invention;

FIG. 2 is a side elevational view (partly in section) of a protective cover which may be used ancillary to the first and second embodiments;

DETAILED DESCRIPTION OF THE DRAWING

Figure 1:
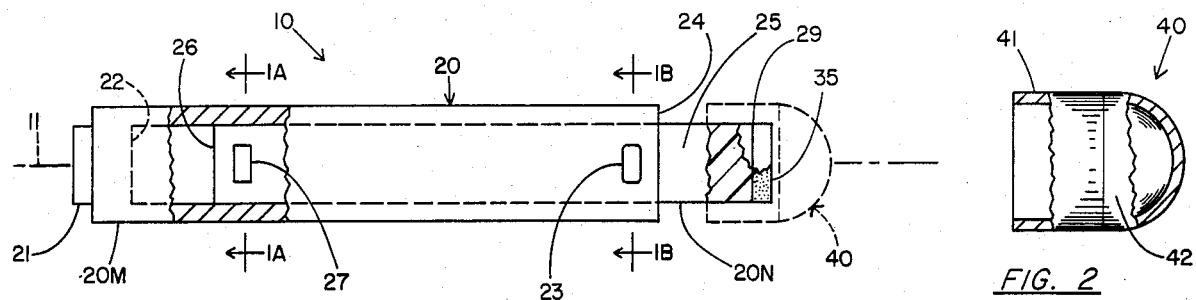
FIGS. 1A and 1B are sectional elevational views taken along lines 1A—1A and 1B—1B of FIG. 1.
Figure 3:
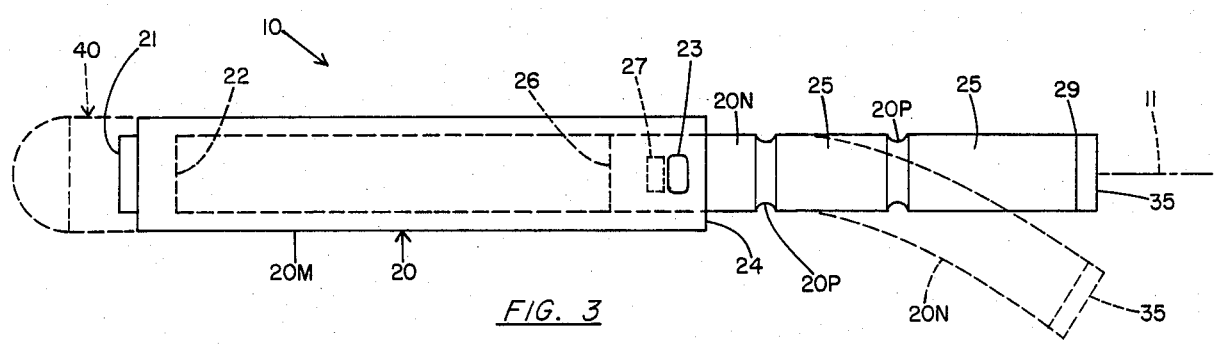
FIG. 3 is a side elevational view (partly in section) of the FIG. 1 first embodiment with the handle extended and with the FIG. 2 protective cover removably engaged.

Retrieval tool first embodiment 10 of FIGS. 1 and 3 generally comprises an elongate handle member 20 extending along lineal central-axis 11 and preferably having a selectively variable length between a rearward-end 21 and a forward-end 29, a probe consisting of a normally tacky adhesive 35 located forwardly of and herein directly adherently attached to handle forward-end 29, the adhesive (35) also being adapted to adhere to a document or other semi-obscured and tool-rescuable article, and a protective cover (40) tack-maintenance means for the adhesive probe.

Figure 1B:
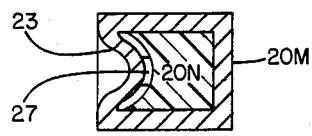
Figure 1A:
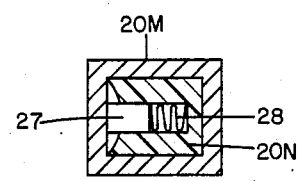

Handle member 20 for tool embodiment 10 comprises a manually graspable rearward-section 20M tubularly surrounding central-axis 11 and having a herein necked (21) rearward-end and a forward-terminus 24. Handle member embodiment 20 also includes a lineal forward-section 20N telescopically slidably received within rearward-section 20M, forward-section 20N having a rearward-terminus 26 and a forward-end 29. Though the cross-sectional shapes for the telescoping handle sections are conventionally selectable, rearward-section 20M herein is rectangularly tubular and forward-section 20N herein is generally cross-sectionally rectangular though one of the four sides is slightly concave as indicated in FIGS. 1A and 1B. In order to limit the forward extendability of the forward-section 20N, it includes a spring-loaded (28) button 27 adapted to abuttably stop against a forwardly located inward depression 23 of rearward-section 20M. 25 indicates the longitudinally extending surfaces of handle member forward-section 20N.

As indicated in FIG. 3 phantom line, it is desireable that at least the forward portions of the handle member be resiliently flexible in directions transverse to central-axis 11. Such resilient flexibility facilitates negotiation of the adhesive probe (e.g. 35, 55) to the locale of the tool-rescuable semi-obscured article. In this vein, forward-section 20N is structurally provideable of resiliently deflectable resinous structural material and/or structurally weakened with circumferential grooves 20P.

The probe includes a normally tacky and empirically selectable adhesive (e.g. 35, 55) for adhering to documents or other tool-rescuable semi-obscured articles. In rudimentary tool embodiment 10 of FIGS. 1 and 3, the probe consists entirely of adhesive material 35 which is wholly relegated and adherently attached to the handle member planar forward-end 29.

There are tack-maintenance means for the probe adhesive, such as the removably engageable protective cover 40 depicted in FIG. 2. Protective cover 40 herein includes a cross-sectionally rectangular sleeve portion 41 joined to a hemispherical dome portion 42. Thus, as indicated in FIG. 1 phantom line, between periodic retrieval usages, cover 40 at sleeve portion 41 is removably engaged to the handle surfaces 25 whereby the dome portion 42 maintains the adhesive integrity by preventing oxidation or fouling thereof. And as indicated in FIG. 3 phantom line, the protective cover (40) is similarly removably engageable to the handle necked rearward-end (21) to prevent cover loss during periods of actual tool usage.

Figure 5:
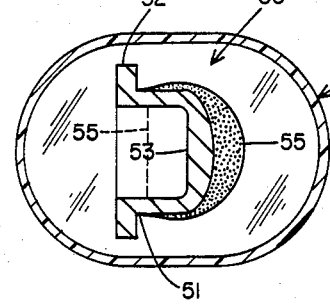
FIG. 5 is a sectional elevational view taken along line 5—5 of FIG. 4.
Figure 4:
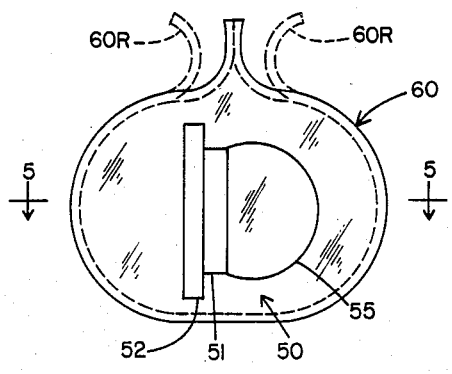
FIG. 4 is an elevational view of a cap type adhesive probe in a resinous envelope and utilizeable in the retrieval tool second embodiment (10A) of FIG. 6.

Drawing FIGS. 4 and 5 depict an alternate probe 50 originally provideable in a tack-maintenance type rupturable envelope package 60. Cap type probe 50 includes an outwardly flanged (52) skirt portion 51 adapted to surround axis 11 and being adapted for secure removable attachment to the handle member forward-end (e.g. at 29). Probe 50 also includes a preferably forwardly convex wall 53 attached to skirt 51 and an adhesive in globular form 55 tenaciously adhered to convex wall 53 and to considerable (but limited) areas of probe skirt 51. As indicated in FIG. 4 phantom line, the resinous film protective envelope package 60 is manually rupturable (60R) whereupon the probe 50 is extractable therefrom and then removably attachable to the handle member (e.g. 29).

Figure 6:
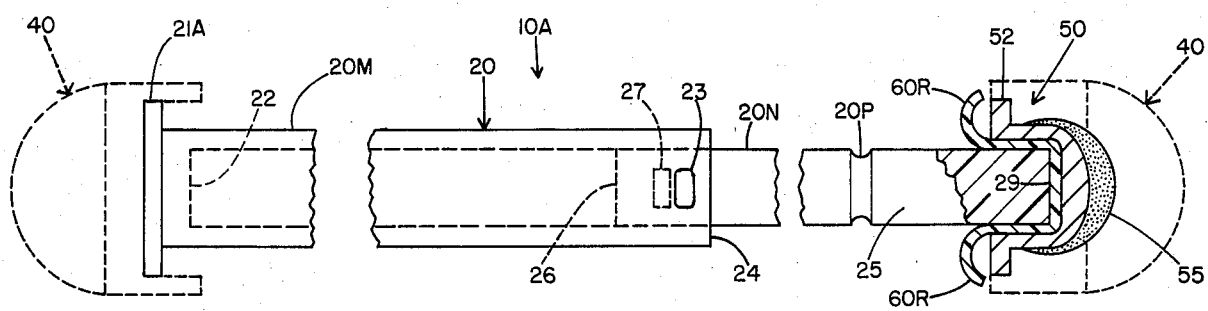
FIG. 6 is a sectional elevational view (partly in section) and akin to FIG. 3 of a retrieval tool second embodiment (10A).

The retrieval tool second embodiment 10A of FIG. 6 employs a handle member (20) substantially identical to that for tool first embodiment 10. However, the handle member rearward-end is changed from said embodiment 10 neck (21) to an outward flange type (21A) which is geometrically and dimensionally similar to that for probe outward flange 52. Tool second embodiment 10A differs primarily from embodiment 10 in that the adhesive is not directly adhered to the handle forward-end 29, but rather takes the cap type probe form 50 which is removably attached to the handle forward-end. In cases of frictional removable attachment, portions of the rupturable resinous package 60 might be employed to enhance such frictional attachment between the probe skirt 51 and the handle at forward-end 29. After numerous retrieval usages and the probe adhesive power eventually becomes exhausted, the entire probe may be quickly and readily replaced at the handle forward-end with a fresh probe (50) extracted from another rupturable package (60). However, until such eventual exhaustion of a probe, the same handle mounted probe may be protected between retrieval episodes by removably engaging the protective cover (40) to the mounted probe (at flange 52). And analogously as for embodiment 10, during actual retrieval usage, the protective cover may be temporarily carried at handle flange 21A.

It is envisioned that several of the cap type probes, each within its own tack-maintaining original package (e.g. 60), might be marketed in convenient integral combinations with one or more retrieval tools.

From the foregoing, the retrieval tools for semi-obscured articles will be readily understood and further explanation is believed to be unnecessary. However, since numerous modifications and changes will readily occur to those skilled in the art, it is not desired to limit the invention to the exact constructions shown and described, and accordingly, further modifications and equivalents may be resorted to, as encompassed by the scope of the appended claims.

We claim:

1. Retrieval tool for adhesion to semi-obscured articles, said retrieval tool comprising:
   (A) an elongate handle member extending longitudinally along a lineal central-axis and including a manually graspable rearward-length terminating as a handle member rearward-end and also including a forward-length terminating as a handle member forward-end; and
   (B) an adhesive probe adapted to adhere to a said semi-obscured article, said adhesive probe comprising:
      (i) a skirt portion surrounding said central-axis and being removably securely attached to the handle member at the forward-end thereof,
      (ii) a wall portion attached to said skirt portion and transversely intersecting said central-axis, and
      (iii) a tacky adhesive being carried by at least the wall portion of said adhesive probe.

2. The retrieval tool of claim 1 wherein the elongate handle member is provided with length variance means for selectively varying the distance between the rearward-end and the forward-end.

3. The retrieval tool of claim 2 wherein the handle member comprises a plurality of handle sections respectively maintained in telescoping relationship along said central-axis, one of said sections being a rearward-section providing said handle member rearward-length and rearward-end, and another of said sections being a forward-section providing said handle member forward-length and forward-end.

4. The retrieval tool of claim 1 wherein the elongate handle member forward-length is resiliently flexible in directions transverse to said central-axis.

5. The retrieval tool of claim 4 wherein the handle member comprises a plurality of handle sections respectively maintained in telescoping relationship along said central-axis, the forwardmost of said handle sections being a forward-section provided of resiliently flexible structural material and providing the handle member forward-end.

6. The retrieval tool of claim 1 wherein there are tack-maintenance means comprising a protective cover having a removably engaged relationship with the tool and in surrounding relationship to the adhesive probe.

7. The retrieval tool of claim 6 wherein the protective cover is also removably engageable to the handle member adjacent the rearward-end thereof.

8. The retrieval tool of claim 1 wherein a rupturable resinous film intervenes between the handle member forward-end and said adhesive probe.

9. The retrieval tool of claim 8 wherein said rupturable resinous film takes the form of a rupturably opened pre-usage storage envelope for said adhesive probe.

10. The retrieval tool of claim 1 wherein the wall portion extends convexly forwardly from the skirt portion; and wherein the tacky adhesive is adhered to said convex wall portion and extends continuously therefrom for adhesion also to a limited portion of the skirt portion.

11. Retrieval tool for adhesion to semi-obscured articles, said retrieval tool comprising:
   (A) an elongate handle extending longitudinally along a lineal central-axis and including a plurality of sections respectively maintained in telescoping relationship along a central-axis, one of said sections being a manually graspable rearward-section and having a rearward-end, and the forwardmost of said sections being a transversely resiliently flexible forward-section and providing a forward-end for said handle;
   (B) an adhesive probe comprising:

(i) a skirt portion surrounding said central-axis and being removably securely attached to the handle at the forward-end thereof,
(ii) a wall portion attached to the skirt portion and exting convexly forwardly therefrom, and
(iii) a tacky adhesive carried by said convex wall portion and also by limited areas of said skirt portion;
(C) rupturable resinous film intervening between the handle forward-end and said removably attached adhesive probe; and
(D) a protective cover member for the tacky adhesive portion of said adhesive probe, said cover member surrounding said tacky adhesive and being removably engaged to said skirt portion at non-adhesive areas thereof.

12. The retrieval tool of claim 11 wherein the protective cover member is also removably engageable to the handle adjacent the rearward-end thereof.

13. The retrieval tool of claim 12 wherein both the adhesive probe at the skirt portion and the handle adjacent the rearward-end are outwardly flanged to permit removable engagements with said protective cover member.

* * * * *